US006542930B1

United States Patent
Auvenshine (10) Patent No.: US 6,542,930 B1
(45) Date of Patent: Apr. 1, 2003

(54) DISTRIBUTED FILE SYSTEM WITH AUTOMATED FILE MANAGEMENT ACHIEVED BY DECOUPLING DATA ANALYSIS AND MOVEMENT OPERATIONS

(75) Inventor: John Jason Auvenshine, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/520,585

(22) Filed: Mar. 8, 2000

(51) Int. Cl.$^7$ .............................................. G06F 15/16
(52) U.S. Cl. ...................................................... 709/224
(58) Field of Search ................................ 709/224, 201, 709/220, 221, 222

(56) References Cited

U.S. PATENT DOCUMENTS

| | | | | |
|---|---|---|---|---|
| 5,014,197 | A | | 5/1991 | Wolf ............................ 364/22 |
| 5,724,556 | A | | 3/1998 | Soudert et al. .............. 395/500 |
| 5,790,886 | A | | 8/1998 | Allen ......................... 395/825 |
| 5,892,914 | A | | 4/1999 | Pitts ....................... 395/200.49 |
| 5,918,229 | A | * | 6/1999 | Davis et al. ................... 707/10 |
| 5,948,062 | A | * | 9/1999 | Tzelnic et al. .............. 709/219 |
| 5,951,658 | A | | 9/1999 | Daray et al. ................... 710/56 |
| 6,219,693 | B1 | * | 4/2001 | Napolitano et al. ......... 709/203 |
| 6,298,386 | B1 | * | 10/2001 | Vahalia et al. .............. 709/234 |
| 6,453,354 | B1 | * | 9/2002 | Jiang et al. ................. 709/229 |

FOREIGN PATENT DOCUMENTS

| | | |
|---|---|---|
| EP | 715257 | 6/1996 |
| JP | 07311744 | 11/1995 |
| JP | 09160857 | 6/1997 |
| JP | 09305547 | 11/1997 |
| JP | 1021125 | 1/1998 |
| JP | 10333964 | 12/1998 |
| JP | 11154111 | 6/1999 |

OTHER PUBLICATIONS

Abstract: Data Flow Analysis Driven Dynamic Data Partitioning by J. Tims et al. dated May 28–30, 1998, Languages, Compilers, and Run–Time Systems for Scalable Computers. 4$^{th}$ International Workshop, LCR '98. Selected Papers, pp. 75–90, Published: Berlin, Germany, 1998, ix+409 pp.
Abstract: A Study of Dynamic Load Balancing In A Distributed System by A. Hac et al. dated Aug. 5–7, 1986, Computer Communication Review, vol. 16, No. 3, pp. 348–356, Aug. 1986, B15.
Abstract: Implementation And Performance Evaluation Of A Distributed Paged–Object Storage Server by Bai Guangyi et al dated Nov. 1995, IEICE Transactions on Information and Systems, vol. E78–D, No. 11, pp. 1439–1448, Nov. 1995.

(List continued on next page.)

Primary Examiner—David Y. Eng
(74) Attorney, Agent, or Firm—Dan Hubert & Assoc.

(57) ABSTRACT

A computer-driven file management technique is applied to a distributed file system with multiple storage "aggregates" to improve file distribution, user access, server workload, and the like. For a first aggregate, a recognition module analyzes file contents of all aggregates, plans a set of physical data movement operations to configure data stored upon a first one of the aggregates according to certain prescribed "goals," and buffers the planned physical data movement operations. The planned set of physical data movement operations constitute a "virtual" data move. The reviewing, planning, and buffering operations are repeated for all remaining aggregates in the distributed file system. However, each repeated reviewing operation considers the file contents of the aggregates as if all previous virtual data moves had actually been performed. Asynchronously with the storage analysis and reconfiguration planning, the system processes the action buffer. Namely, the system reads buffer contents according to a prescribed order, consults predetermined action "rules," and then carries out the physical data moves in accordance with the action rules. The action rules may specify desirable hours to move data or avoid moving data, for example.

17 Claims, 5 Drawing Sheets

OTHER PUBLICATIONS

Abstract: Limited Effects Of Finite Storage On A Beneficial File Migration Policy by R. T. Hurley et al. dated Oct. 2–5, 1994, Proceedings. 19$^{th}$ Conference on Local Computer Networks (Cat. No. 94TH8004), pp. 432–439, Published: Los Alamitos, CA, USA, 1994, xii+467 pp.

Abstract: Performance Analysis Of Client–Server Storage Systems by E. Drakopoulos et al. dated Nov. 1992, IEEE Transactions on Computers, vol. 41, No. 11, pp. 1442–1452, Nov. 1992.

Abstract: Performance Study Of Client–Server Storage Systems by E. Drakopoulos et al. dated Oct. 7–10, 1991, Digest of Papers. Eleventh IEEE Symposium on Mass Storage Systems (Cat. No. 91CH3039–5), pp. 67–72, Published: Los Alamitos, CA, USA, 1991, xi+161 pp.

Abstract: Performance Of File Migration In A Distributed File System by R. T. Hurley et al. dated Nov. 4–9, 1990, Proceedings of the 10$^{th}$ International Conference on Computer Communication, pp. 685–692, Published: New Delhi, India, 1990, 831 pp.

* cited by examiner

DISTRIBUTED FILE SYSTEM WITH AUTOMATED FILE MANAGEMENT ACHIEVED BY DECOUPLING DATA ANALYSIS AND MOVEMENT OPERATIONS

BACKGROUND OF THE INVENTION

1. Field of the Invention

The present invention relates to distributed digital data storage systems. More particularly, the invention concerns a file management technique for a distributed file system with multiple storage units called "aggregates." A "recognition" module analyzes the overall storage contents of each aggregate, then performs a virtual synchronous data move operation to reconfigure the contents of that storage aggregate. Physical data moves are actually buffered for asynchronous performance by an "action module" in accordance with certain data movement rules.

2. Description of the Related Art

A distributed file system "cell" includes many file servers, each containing many storage areas that are called "aggregates." An aggregate may correspond to one or more logical or physical devices (such as magnetic "hard" disk drives), or a portion thereof. Each aggregate contains many smaller units of user data, called "filesets." For ease of reference, the term "file management" is used herein to include the management of data such as filesets and files.

Distributed file system cells can be quite large, including thousands of filesets and hundreds of aggregates. Consequently, data management workload can be substantial. The data management process, which occurs repeatedly and dynamically, depends upon many different factors, which frequently conflict. For example, care must be taken to avoid optimization strategies that repeatedly move filesets back and forth, known as "churning." Another pitfall is over-allocating storage space for one or more of a file server's aggregates, causing the file server to run out of storage space. Another potential problem is storing too many filesets that receive too many simultaneous accesses in a file server's aggregates, potentially overloading the file server.

Data management, then, is a complicated process that must consider a number of competing factors. Often, data management is performed by a human administrator initially assigning aggregates or subparts to specific applications or clients, and then analyzing the cell contents and moving filesets as needed. Sometimes, administrators employ automation scripts to apply simple space management rules for the purpose of rearranging filesets. Even so, the data management process requires a substantial amount of manual supervision and command execution. Some may believe that file management is most accurately and effectively done with the human touch, since the automated file management tools are insufficiently comprehensive. Others, however, may encounter some frustration with the labor costs, time consumption, and possible mistakes of this type of file management. In any case, certain unsolved problems prevent known file management techniques from being completely adequate.

SUMMARY OF THE INVENTION

Broadly, the present invention concerns a file management technique for a distributed file system with multiple storage "aggregates." For each aggregate, a "recognition" module analyzes the overall storage contents, then performs a virtual synchronous data move operation to reconfigure the contents of that storage aggregate according to certain prescribed "goals" Physical data moves are actually buffered for asynchronous performance by an "action module" in accordance with certain data movement "rules." Thus, the cell can be virtually manipulated towards its ideal state before the corresponding physical activity is completed.

These operations are described in greater detail as follows. For a first aggregate, the system starts by reviewing files contained on the first aggregate, along with storage statistics concerning of all aggregates, and planning a set of physical data movement operations to configure data stored upon the first aggregate according to certain prescribed goals. Since the system actually buffers the planned physical data movement operations, the planned set of physical data movement operations may be considered as a "virtual" data move. The reviewing and planning operations may employ an expert system, for example. The reviewing, planning, and buffering operations are repeated for all remaining aggregates in the distributed file system. However, each repeated reviewing operation considers the file contents of the aggregates as if all previous virtual data moves had actually been performed.

Asynchronously with the foregoing storage analysis and reconfiguration planning, the system processes the contents of the action buffer. Namely, the system reads buffer contents according to a prescribed order, consults predetermined action rules, and then carries out the physical data moves in accordance with the action rules. The action rules may specify desirable hours to move data or avoid moving data, for example.

The foregoing features may be implemented in a number of different forms. For example, the invention may be implemented to provide a method of automatically managing files in a distributed file system by decoupled data analysis and movement operations. In another embodiment, the invention may be implemented to provide an apparatus, such as a distributed file system configured to perform file management as described herein. In still another embodiment, the invention may be implemented to provide a signal-bearing medium tangibly embodying a program of machine-readable instructions executable by a digital data processing apparatus to perform file management tasks as explained herein. Another embodiment concerns logic circuitry having multiple interconnected electrically conductive elements configured to perform the subject file management operations.

The invention affords its users with a number of distinct advantages. For example, computer-driven file management reduces or avoids the workload and costs incurred by human computer administrators. And, the automated file manager can easily operate twenty-four hours each day without complaint. Furthermore, automated file management offers greater accuracy since it is not subject to fatigue and calculation errors of human operators. Furthermore, the automated file manager can conduct more complicated and exhaustive analysis of storage contents, since it uses high speed computing machines.

Another advantage of this invention is that the recognition and action modules are decoupled. Thus, analysis and action can run at different times, even on different machines. Furthermore, even though data analysis may occur during normal hours, data movement can be performed after-hours without requiring a human administrator to work at such times. If desired, move requests generated by the recognition module can be analyzed or screened by an administrator before they are implemented. Moreover, with decoupled recognition/action, pending requests can be prioritized (and re-prioritized) after their entry into the action buffer by the recognition module. Finally, decoupling of recognition and action modules facilitates the manual generation of move requests unrelated to operation of the recognition module. Such requests are carried out by the action module automatically, right along with other requests generated by the recognition module.

In addition, the present invention offers concurrent, multi-factor analysis, providing more efficient allocation of filesets than possible with human administrators or simple single-factor automation scripts. For example, the invention considers varied and complex parameters such as ratios of free/used space, server CPU load, aggregate I/O load, fileset access history, etc.

Beneficially, the recognition module's goals may be chosen to allow the encoding of business rules for data management. Value parameters, for example, facilitate the setting of specific thresholds (e.g., 85% full as maximum aggregate capacity). Additionally, ratio parameters allow functional tradeoffs to be made (e.g., the ideal ratio of CPU load versus space used for a particular aggregate). Also, prioritization parameters allow priority tradeoffs to be made (e.g., the importance of maintaining an adequate amount of free space versus clearing off data from a particular server).

Unlike automation scripts, where parallelism is difficult to achieve and manage, the present invention conducts managed parallel data movement. This speeds the implementation of desired space management actions and maximizes the available data movement windows without overloading the servers. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections
Introduction

Figure 1A:
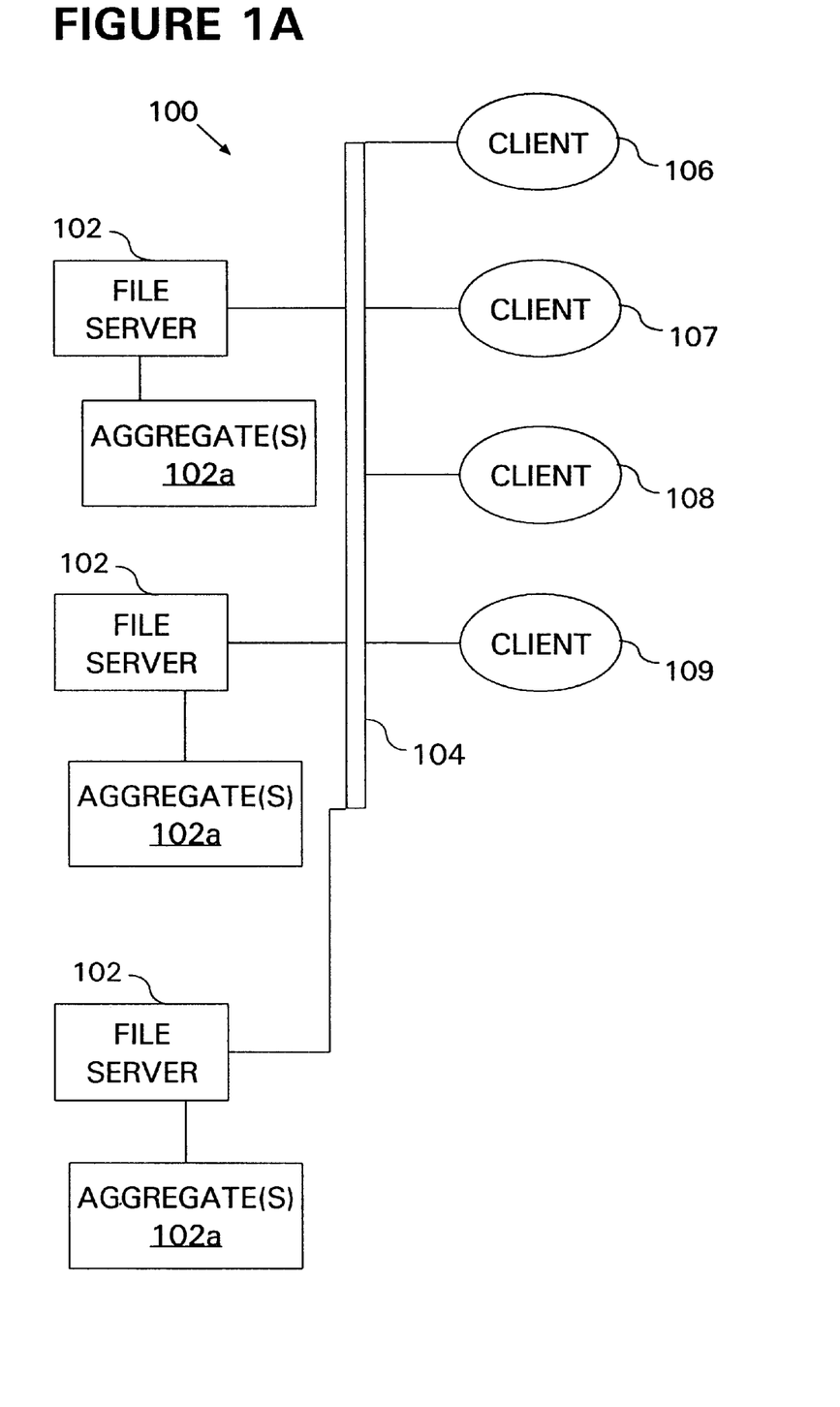
FIG. 1A is a block diagram of the hardware components and interconnections of a file management cell according to the invention.

One aspect of the invention concerns a distributed file system, which may be embodied by various hardware components and interconnections, with one example being described in FIG. 1. FIG. 1 depicts a distributed file system 100, also called a "cell" 100. The cell 100 includes a number of subparts, including various file servers 102, a communications link 104, and various client machines ("clients") 106–110.

File Servers

Each file server 102 comprises one or more computers that provide clients with access to user data stored on the aggregate(s) 102a housed within, attached to, or otherwise accessible to that file server 102. Each aggregate may comprise a physical device, logical device, a combination of multiple physical and/or logical devices, parts of physical and/or logical devices, etc. An exemplary file server 102 and its counterpart aggregates 102a may be provided by an IBM RAMAC 7133 DASD subsystem. Individual items of user data may comprise files, logical volumes, bytes, bits, data pages, or another convenient unit. In the present example, items of user data are referred to as "fileset."

Clients

The file servers 102 are coupled to the clients 106–109 by a communications link 104, such as a local area network, wide area network, token ring, Internet, Intranet, satellite link, RF wireless link, fiber optics, conductive wires, telephone line, cables, DS3 link, or other appropriate connection.

Each client 106–109 comprises a computing machine that utilizes data stored on the aggregates 102a, which is managed by the file servers 102. In this sense, the clients are served by the file servers 102. Examples of the client machines include personal computers, computer workstations, mainframe computers, RS/6000 machines, etc. These machines may utilize any suitable operating system, such as WINDOWS 95/98, WINDOWS NT, AIX, MVS, etc.

Cell Administrator

One or more of the clients 106–109 may act as cell administrators. Namely, be entering a particular user identification and password at a client station 106–109, a person can run various file management application programs that are only accessible to all administrators. These application programs are stored in the aggregates 102a, and executed by the file servers 102. Access is appropriately controlled by the file servers 102. Other security measures may be implemented instead, such as an identity verification system, communications protocol, access control list, etc.

Figure 1B:
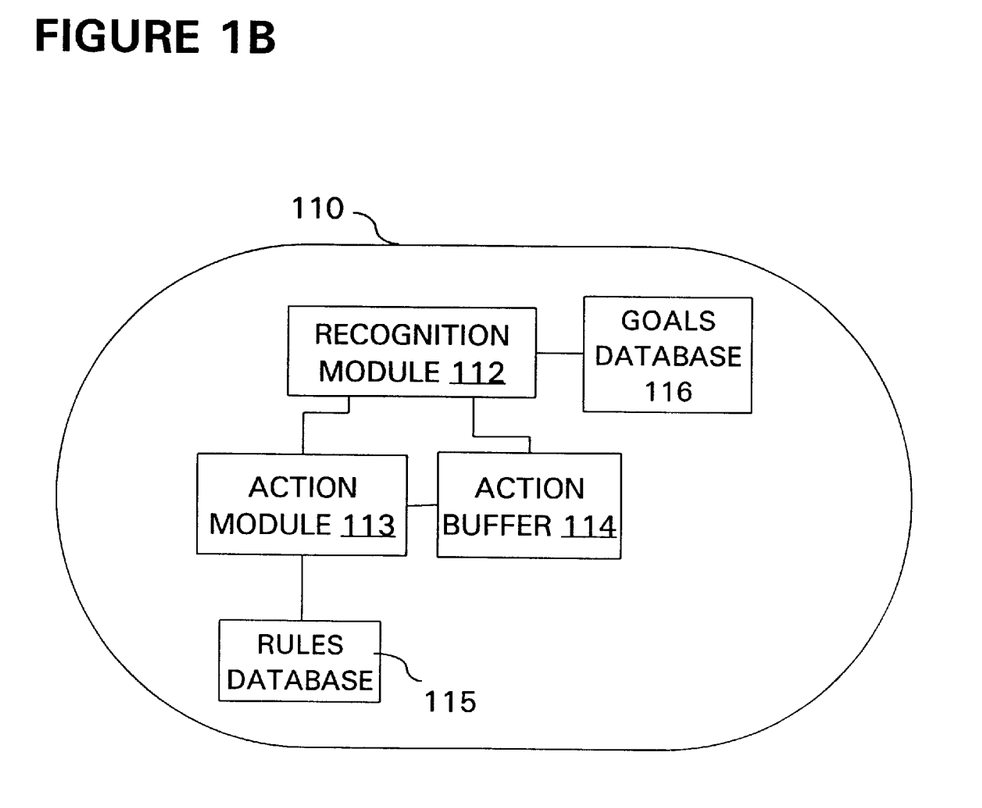
FIG. 1B is a block diagram of a cell administrator machine, according for the invention.

One useful way to illustrate the all administrator's invocation of the file management application programs is to illustrate a virtual file management machine 110 (FIG. 1B). When executed by file servers 102, the file management application programs act like the virtual machine 100, and serve to conduct various file management functions such as moving data among the aggregates 102a.

Although the virtual machine 110 is implemented by one or more file servers 102 as described herein, the virtual machine 100 may alternatively be implemented by another hardware machine (not shown) attached to the link 104, by a client machine 106–109, etc.

The virtual machine 110 includes a recognition module 112, action module 113, action buffer 114, rules database 115, and goals database 116. To facilitate more independent operation, some or all of the application programs corresponding to these components may be stored on separate aggregates. Furthermore, one or more of these components may be implemented by hardware components. As explained in greater detail below, the recognition module 112 repeatedly (1) analyzes the condition and operation of all aggregates, and also analyzes the fileset contents of aggregates under consideration for reconfiguration (2) plans a set of physical data movement operations to configure data stored upon the aggregates in need of reconfiguration according to contents of the goals database 116, and (3) enters the planned physical data movement operations into the action buffer 114. The recognition module 112 may be implemented by an expert system, for example. The planned physical data movement operations constitute "virtual" data moves. The reviewing, planning, and buffering operations are repeated for all remaining aggregates in the cell 100, and may even be repeated continuously. Each repeated reviewing operation considers the contents of the aggregates as if all virtual data moves had actually been performed.

The action module 113 processes the action buffer 114 asynchronously with the activity of the recognition module 112. Namely, the action module 113 reads the action buffer 114 contents according to a prescribed order, and then carries out the physical data moves in accordance with the rules stored in the rules database 115. The rules prescribe various conditions under which actions can or cannot be carried out. For example, the rules may specify preferred or restricted times of day for conducting data move operations. Actions that satisfy the rules database are ultimately carried out by transmitting appropriate instructions to the file servers 102, which are recognized and obeyed because of the cell administrator's authority.

Exemplary Digital Data Processing Apparatus

Another aspect of the invention concerns a digital data processing apparatus, which may be used to implement the virtual machine 110 in hardware, or to implement the file servers 102 that run the application programs that constitute the virtual machine 110 and thereby implement the virtual machine 110 in software. The foregoing digital data processing apparatus may be embodied by various hardware components and interconnections; one example is the digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, a different embodiment of the invention uses logic circuitry instead of computer-executed instructions. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

In addition to the various hardware embodiments described above, a different aspect of the invention concerns method for file management in a distributed file system with multiple storage aggregates.

Signal-Bearing Media

Figure 2:
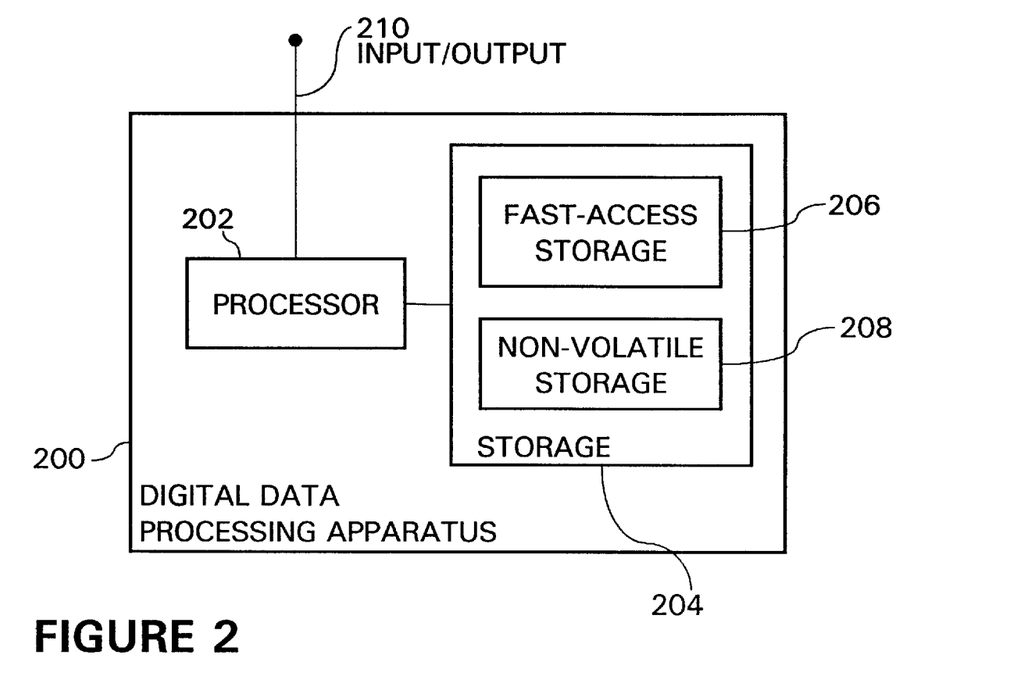
FIG. 2 is a block diagram of a digital data processing machine according to the invention.

In the context of FIGS. 1–2, such a method may be implemented, for example, by operating one of the file servers 102 or other processing entity, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to conduct file management in a distributed file system with multiple storage aggregates.

Figure 3:
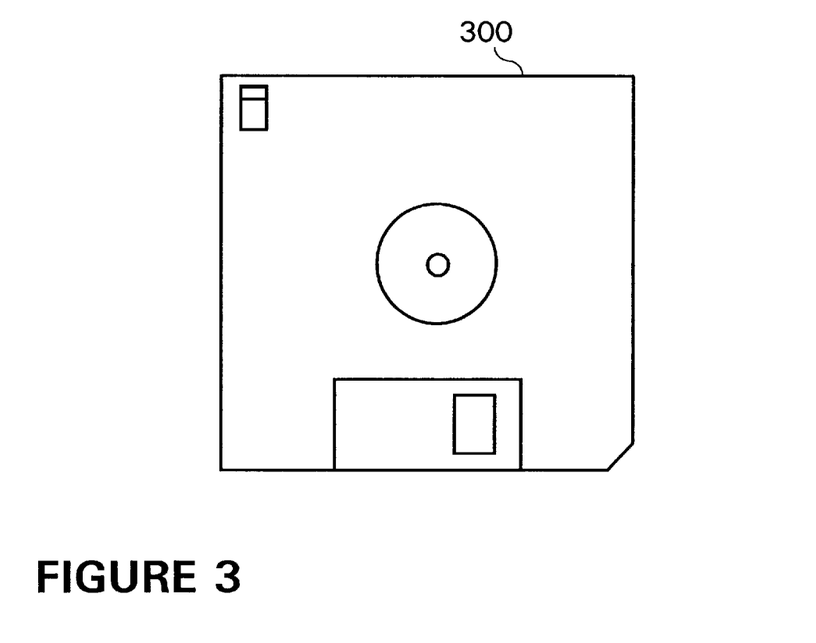
FIG. 3 shows an exemplary signal-bearing medium according to the invention.

This signal-bearing media may comprise, for example, RAM (not shown) contained within the file server 102, as represented by the fast-access storage 206. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional "hard drive", redundant array of inexpensive disks ("RAID"), or another direct access storage device ("DASD")), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may occur in a language such as "KornShell," etc.

Logic Circuitry

In contrast to the signal-bearing medium discussed above, the method aspect of the invention may be implemented using logic circuitry, without using a processor to execute instructions. In this embodiment, the logic circuitry is implemented in a file server 102 or other appropriate entity, and is configured to perform operations to implement the method of the invention. The logic circuitry may be implemented using many different types of circuitry, as discussed above.

Recognition

Figure 4:
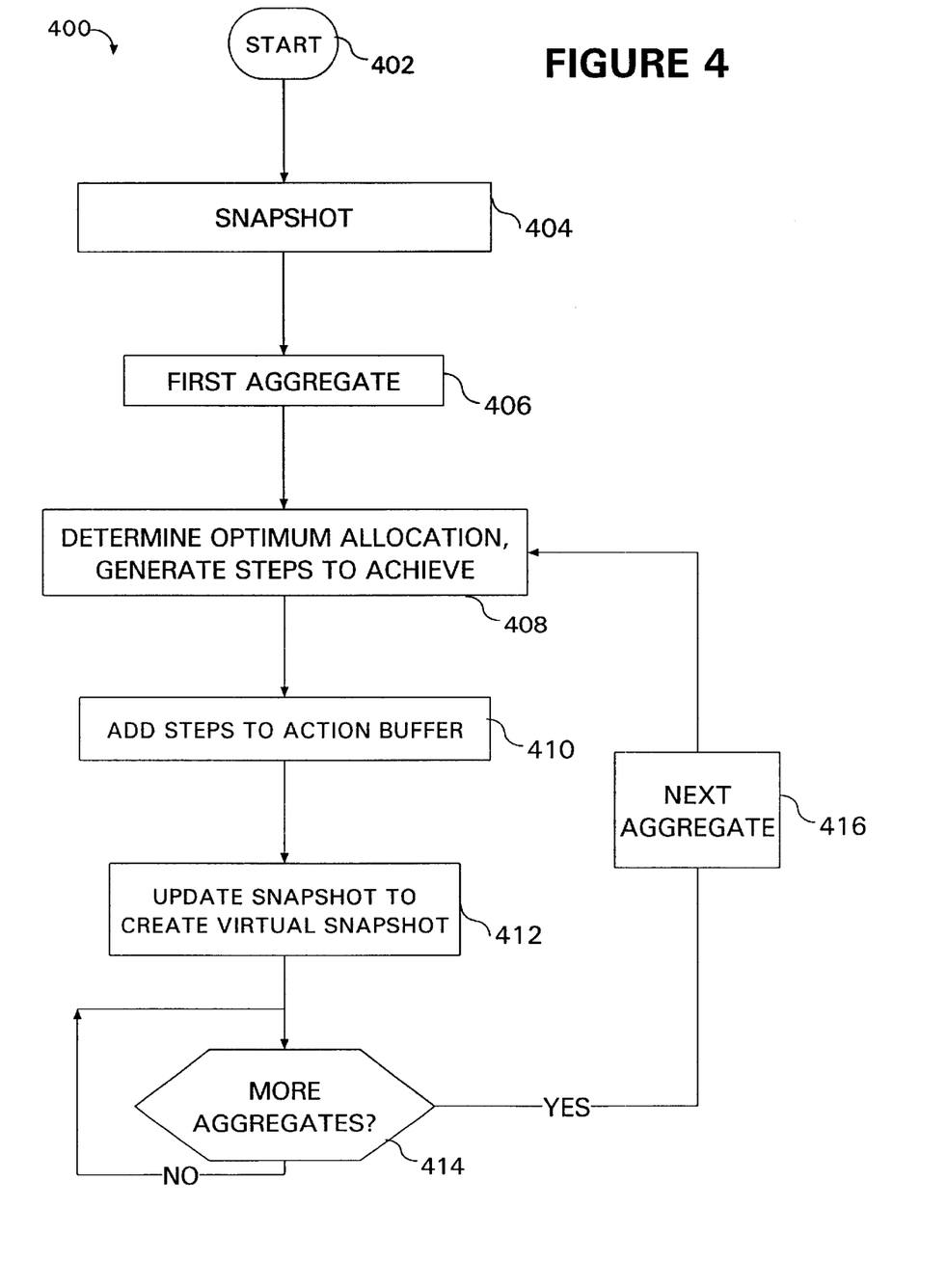
FIG. 4 is a flowchart of an operational sequence performed by an "recognition module" to review data storage contents and perform a virtually synchronous data move operation to reconfigure storage according to the invention.

FIG. 4 shows the operating sequence 400 of the recognition module 112. Broadly, the recognition module 112 analyzes the overall storage contents, then performs virtual synchronous data moves operation to reconfigure the storage contents. Physical data moves are actually buffered for asynchronous performance by the action module 113 (discussed below), in accordance with certain data movement rules.

For ease of explanation, but without any intended limitation, the example of FIG. 4 is described in the context of the cell 100 described above. Before initiating the sequence 400, a human administrator programs the recognition module 112. The manner of programming the recognition module 112 depends upon the its particular hardware implementation. For instance, the module 112 may be programmed by configuring a neural network, preparing a software sequence for a computer processor, preparing a rule database, or in the presently illustrated example, training an expert system. In any case, "training" or programming of the recognition module 112 defines certain desirable characteristics for file layout on the aggregates 102. These characteristics, called "goals," are stored in the goals database 116. Goals may specify target values, tradeoffs, priorities, and other appropriate considerations. A partial list of several exemplary goals follows:

1. Avoid churning, where an exemplary definition of churning is the repeated movement of a fileset between aggregates more than twice per day.
2. Evenly allocate computation workload among the file server 102 CPUs.
3. Evenly allocate input/output workload among all the aggregates.
4. Evenly distribute allocated and used space among all available aggregates.
5. Ensure that each file server's aggregates 102a contain a minimum amount of available filespace, such as ten percent.
6. Ensure that the ratio of allocated space to available total space on each file server's aggregate does not exceed a certain percentage, such as 200%.
7. Ensure that the highest corporation workload on any single fileserver does not exceed a threshold, such as 90%.

Having programmed the goals database 116, the sequence 400 is thereafter initiated in step 402, whereupon the recognition module 112 examines the state of the files stored in the aggregates 102 (step 404). Since the state of the files is examined as to a specific time, this is called taking a "snapshot" of the aggregate storage 102. The snapshot of step 404 may consider various properties of the aggregates' data contents, such as:

1. The historical load pattern of the file servers, including CPU and I/O activity.
2. The amount of space being utilized on each aggregate 102, and the amount of space allocated on each aggregate 102.
3. The human administrator's intent for each file server 102, such as clearing data off of a file server's aggregate, placing certain types of data on certain servers, or refraining from placing new data on certain servers.
4. The total amount of space in each aggregate (i.e., aggregate size).

After step 404, the recognition module 112 considers a first aggregate, making this the "current" aggregate (step 406). Although the storage is evaluated aggregate-by-aggregate in this example, other convenient groupings may be used, such as an physical devices, logical devices, by groups of varying sizes, etc. In step 408, the recognition module 112 determines the optimum allocation of filesets in the current aggregate, according to the goals database 116. Also in step 408, the recognition module 112 generates a specific set of data movement instructions to implement this optimum fileset allocation. The data movement instructions, for example, may comprise commands that are executable by the file servers 102. The data movement instructions are referred to as "actions."

After step 408, the recognition module 112 enters the actions into the action buffer 114 (step 410). Step 410 may optionally enter an associated priority for each action, which is utilized by the action module 113 in applying the action "rules" as discussed in greater detail below. As one example, each action may exist in the form of a file containing the respective fileset's name, source aggregate, and destination aggregate. Each action is buffered by storing it in the action buffer 114.

In addition to the actions buffered by the recognition module 112, actions may be entered from other sources. For example, a cell backup system (not shown) may enter files into the action buffer 114 to indicate the status of backups running on the aggregates 102a. Furthermore, the cell may include a manual move request mechanism, whereby a cell administrator can schedule individual filesets for movement by the action module 113 for reasons other than those contained in the goals database 116.

Following step 410, the recognition module 112 updates the most recent snapshot (in this case, from step 404) to create an updated snapshot representing the state of the storage subsystem as if the file servers had already performed the buffered actions (step 412). This is called a "virtual" snapshot, since it represents a future state of storage rather than representing the actual state of storage.

After step 412, the recognition module 112 asks whether there are any more storage aggregates to analyze (step 414). If so, step 416 advances to the next aggregate, making this the "current" aggregate, and returns to step 408, as discussed above. During the upcoming performance of step 412, and all subsequent performances, the new virtual snapshot is created by updating the last virtual snapshot. If desired, the current snapshot may be discarded whenever step 414 answers in the negative, forcing the creation of a new snapshot each time the sequence 400 is restarted.

Action

Figure 5:
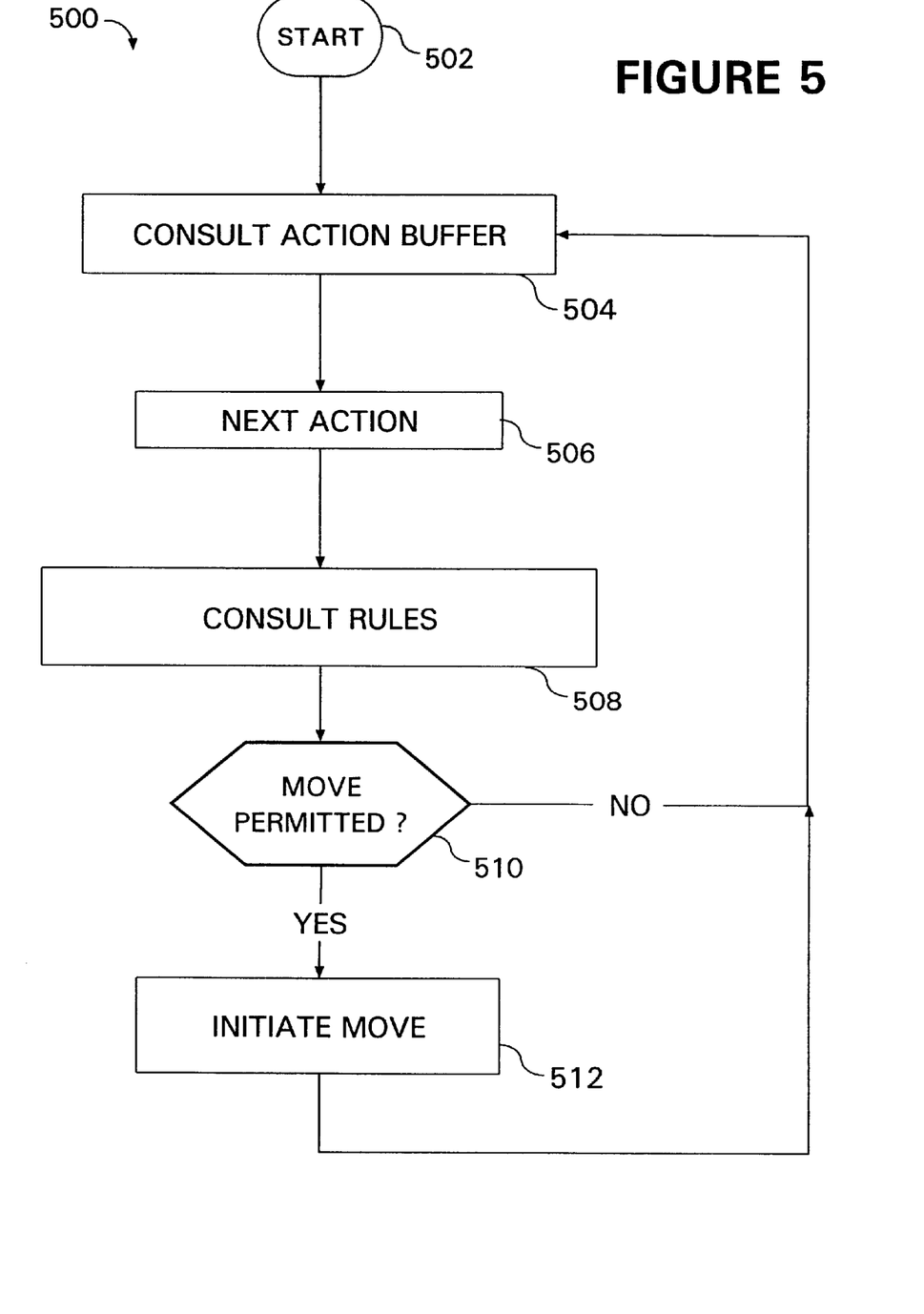
FIG. 5 is a flowchart of an operational sequence performed by an "action module" to implement physical data moves in accordance with applicable movement rules according to the invention.

FIG. 5 shows the operating sequence 500 of the action module 113. Broadly, the action module 113 retrieves pending actions from the action buffer 114, and executes the actions in accordance with the rules database 115. For ease of explanation, but without any intended limitation, the example of FIG. 5 is described in the context of the cell 100 described above. The sequence 500 is initiated in step 502.

First, the action module 113 accesses the action buffer 114 (step 504), and then considers the next buffered action (step 506). This action is referred to as the "current" action. Step 506 may consider actions according to any desired protocol, such as (1) first-in-first-out ("FIFO"), (2) according to which aggregate the action refers to, in case some aggregates are more important than others, (3) according to an optional priority assigned by the recognition module 112 in step 408, (4) according to the size of the fileset referenced by the action, or (5) another protocol. Step 506 may consider multiple actions together or sequentially for performance (step 512) in parallel.

In step 508, the action module 113 consults the rules database 115 prior to executing the action from step 506. The rules database 115 contains a set of "rules" that specify the manner of carrying out actions. An exemplary selection of rules follows:

1. To avoid disrupting business activity, limit execution of actions to night hours, such as between 12 a.m. to 4 a.m.
2. Avoid executing actions for aggregates 102a that are involved, or scheduled to be involved, as the primary or secondary storage in a backup operation.
3. Ensure that, only one action is performed against any aggregate at a time.
4. Relax certain of the rules during weekend, holiday, or other predictable "off" times.

5. Adhere to a maximum number of simultaneous data moves.
6. Move important filesets before moving less important filesets, according to the actions' assigned priorities.
7. Ensure that each action can be carried out within a maximum time period, where the performance time is estimated based upon the size of the fileset to be moved, number of other filesets currently being moved, activity level of the fileset to be moved, etc.
8. Move smaller filesets during business hours, and larger filesets at night. As an alternative, the rules database 115 may be consulted less often, such as every other action, each time of emptying the action buffer 114, once before initially starting to process buffered rules, or another suitable schedule.

In step 510, the action module 113 determines whether the current move operation(s) is permitted by the rules. If the current action is not permitted, step 510 re-enters the current action into the buffer 114 and returns to step 504. The action module 113 re-buffers the current action to ensure reconsideration of the action at some desirable future time. As an alternative, step 510 may amend the action before re-buffering, to prevent repeated rejections under the same rule. As another alternative, step 510 may re-enter the action at the bottom of the buffer.

On the other hand, if the current action is permitted by the rules, step 510 advances to step 512, where the action module 113 initiates the move operation(s) represented by the current action. The move operation may be initiated, for example, by starting a separate process, that process interfaces with the fileservers in a synchronous manner. Alternatively, the action module 113 may initiate the move operations by sending instructions to the appropriate file server(s) 102. The move operations actually occur later, when the file servers execute these instructions. As an alternative, the action module 113 may interact with file server(s) 102 to synchronously execute commands to effect the move operations. After step 512, the sequence 500 returns to step 504, where the action module 113 consults the action buffer 114 again, as discussed above.

Exemplary Pseudocode

TABLE 1 (below) contains a pseudocode listing as one example of a more specific implementation of the sequences of FIGS. 4–5.

TABLE 1

EXEMPLARY PSEUDOCODE LISTING

Recognize:
--------
parameters:
ma.xused=93
desused=85
maxallocation=200
cputhresh=90
IOthresh-50
minspri=1
desspri=2
allocpri=3
loadpri=4
"main" procedure:
FOR each aggregate in the production list
IF pctusedspace > maxused THEN
request movement at priority minspri
ELSE IF pctusedspace > des used THEN
request movement at priority desspri
ELSE IF allocation > maxallocation THEN
request movement at priority allocpri
ELSE IF (CPU load > cputhresh} OR (10 load > IOthresh) THEN TABLE 1-continued

EXEMPLARY PSEUDOCODE LISTING request movement at priority loadpri
ENDIF
ENDFOR
"request movement" procedure:
WHILE movement goal not met DO
FOR each fileset on the source aggregate according to "snapshot"
IF current fileset gets the aggregate closest to meeting movement goal of any seen so far THEN
mark this fileset as best to move
ENDIF
ENDFOR
FOR each aggregate in the allocation list
calculate "score" for this aggregate + best fileset//based on load, allocation, and space used
IF score higher than any seen so far THEN
mark this aggregate as best target
ENDIF
ENDFOR
place a move request in the buffer for the best fileset. from source aggregate to best target at current priority
increment current priority keeps one aggregate's moves from monopolizing the act module
update the snapshot of both the source and target aggregate as if the move actually occurred
ENDWHILE
Act:
--------
parameters:
moverate=2
starthou~2
endhour=23
maxmoves=10
"moveparallel" procedure (automatically launched at starthour):
WHILE time < endhour DO
FOR each move request in the buffer, sorted by priority
IF (backups not running on source aggregate) AND
(backups not running on target aggregate) AND
(number of running moves < maxmoves) AND
(time+(fileset size/moverate) < endhour) AND
(other moves not running on source or target aggregate) THEN
initiate a move operation for the request automove, see below//
ENDIF
ENDFOR
ENDWHILE
"automove" procedure (launched in parallel by "moveparallel" for each fileset to move):
withdraw move request from buffer
mark source and target server as involved in a move
IF source and target server are up and running THEN
execute the low level move command
IF error detected THEN
send a warning notice w/diagnostic information
ENDIF
ELSE
send a warning notice w/diagnostic information
sleep for 10 minutes
replace move request in buffer
ENDIF
unmark source and target server as involved in a move

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A computer-driven method of managing file storage in a distributed file system that includes multiple file servers each including one or more storage aggregates, the method comprising operations of:

for a first aggregate, reviewing storage characteristics of all aggregates, planning one or more physical data movement operations to configure data stored upon the first aggregate according to predetermined criteria, and buffering actions representing the planned physical data movement operations;

repeating the reviewing, planning, and buffering steps for remaining aggregates in the distributed file system, where each repeated reviewing operation considers the file contents of the aggregates as if data movement operations represented by previously buffered actions had already been performed; and asynchronously processing the buffer, comprising initiating physical data movement operations represented by the buffered actions in accordance with predetermined action rules.

2. The method of claim 1, where the reviewing and planning operations are implemented utilizing an expert system.

3. The method of claim 1, the where the actions comprise machine-readable instructions compatible with the file servers.

4. The method of claim 1, where each action comprises a data structure including names of one or more filesets subject to the physical data movement operations represented by the action, a source location of the physical data movement operation and a destination location of the physical data movement operation.

5. The method of claim 1, where:

the buffering operation also includes establishing a priority level for each action; and the operation of initiating the physical data movement operations is conducted according to an order specified by the actions' priority levels.

6. A signal-bearing medium tangibly embodying a program of machine-readable instructions executable by a digital processing apparatus to perform a method for managing file storage in a distributed file system that includes multiple file servers each including one or more storage aggregates, the method comprising operations of:

for a first aggregate, reviewing storage characteristics of all aggregates, planning one or more physical data movement operations to configure data stored upon the first aggregate according to predetermined criteria, and buffering actions representing the planned physical data movement operations;

repeating the reviewing, planning, and buffering steps for remaining aggregates in the distributed file system, where each repeated reviewing operation considers the file contents of the aggregates as if data movement operations represented by previously buffered actions had already been performed; and asynchronously processing the buffer, comprising initiating physical data movement operations represented by the buffered actions in accordance with predetermined action rules.

7. The medium of claim 6, where the reviewing and planning operations are implemented utilizing an expert system.

8. The medium of claim 6, where each action comprises a data structure including names of one or more filesets subject to the physical data movement operations represented by the action, a source location of the physical data movement operation and a destination location of the physical data movement operation.

9. The medium of claim 6, where the actions comprise machine-readable instructions compatible with the file servers.

10. The medium of claim 6, where:

the buffering operation also includes establishing a priority level for each action; and the operation of initiating the physical data movement operations is conducted according to an order specified by the actions' priority levels.

11. A logic circuit of multiple interconnected electrically conductive elements configured to perform operations for managing file storage in a distributed file system that includes multiple file servers each including one or more storage aggregates, the operations comprising:

for a first aggregate, reviewing storage characteristics of all aggregates, planning one or more physical data movement operations to configure data stored upon the first aggregate according to predetermined criteria, and buffering actions representing the planned physical data movement operations;

repeating the reviewing, planning, and buffering steps for remaining aggregates in the distributed file system, where each repeated reviewing operation considers the file contents of the aggregates as if data movement operations represented by previously buffered actions had already been performed; and asynchronously processing the buffer, comprising initiating physical data movement operations represented by the buffered actions in accordance with predetermined action rules.

12. An apparatus for managing files stored in a storage cell including multiple file severs, each coupled to file storage including one or more storage aggregates, the apparatus comprising:

an action buffer;

a goals database specifying target characteristics for contents of the storage aggregates;

a rules database containing action rules regulating file management activities in the storage aggregates;

a recognition module, coupled to the goals database and the action buffer, programmed to perform operations including:

for a first aggregate, reviewing storage characteristics of all aggregates, planning one or more physical data movement operations to configure data stored upon the first aggregate according to the goals database, and storing actions representing the planned physical data movement operations into the action buffer;

repeating the reviewing, planning, and buffering steps for remaining aggregates in the distributed file system, where each repeated reviewing operation considers the file contents of the aggregates as if data movement operations represented by previously buffered actions had already been performed; and an action module, coupled to the rules database and the action buffer, programmed to asynchronously process the action buffer, comprising initiating physical data movement operations represented by the buffered actions in accordance with predetermined action rules.

13. The apparatus of claim 12, where the reviewing and planning operations are implemented utilizing an expert system.

14. The apparatus of claim 12, where the actions comprise machine-readable instructions compatible with the file servers.

15. The apparatus of claim 12, where each action comprises a data structure including names of one or more filesets subject to the physical data movement operations represented by the action, a source location of the physical data movement operation and a destination location of the physical data movement operation.

16. The apparatus of claim 12, where:

the buffering operation also includes establishing a priority level for each action; and the operation of initiating the physical data movement operations is conducted according to an order specified by the actions' priority levels.

17. The apparatus of claim 12, further comprising the multiple file servers and the aggregates.

* * * * *